INVENTOR
LESLIE STANLEY DELAPENA
LEONARD FRANK FROST
DAVID GRIFFITHS JONES
BY

ATTORNEY

Nov. 1, 1960    L. S. DELAPENA ET AL    2,958,524
MEANS FOR HARDENING A SURFACE OF AN ARTICLE BY
ELECTRICAL INDUCTION HEATING AND QUENCHING
Filed June 19, 1957    7 Sheets-Sheet 5

INVENTOR
LESLIE STANLEY DELAPENA
LEONARD FRANK FROST
DAVID GRIFFITHS JONES
BY
Harold F. Smith
ATTORNEY United States Patent Office 2,958,524
Patented Nov. 1, 1960

2,958,524

MEANS FOR HARDENING A SURFACE OF AN ARTICLE BY ELECTRICAL INDUCTION HEATING AND QUENCHING

Leslie Stanley Delapena, Leonard Frank Frost, and David Griffiths Jones, Cheltenham, England, assignors to Delapena & Son Limited, Cheltenham, England Filed June 19, 1957, Ser. No. 666,644

Claims priority, application Great Britain June 21, 1956

11 Claims. (Cl. 266—4)

This invention relates to a method and means for hardening surfaces of metal articles by means of electrical induction heating and quenching.

The invention has for its main object to provide a method and means for hardening surfaces of articles which enable perfect control of the hardness pattern formed on such surfaces to be achieved so that different but similar surfaces on an article or series of articles will carry substantially identical hardness patterns. Another object is to enable the main body of the article to be maintained at a low temperature throughout the hardening process with only a small portion heated at any given time to avoid distortion and enable the main body of the article to be left in the original or pre-heated state beneath the hardened surface or surfaces thereof.

According to the invention a method of hardening a surface of an article by electrical induction heating and quenching comprises the steps of immersing said surface of the article and the heating or work face of an inductor in a liquid cooling medium and, with said surface of the article and heating or work face still immersed, feeding electrical current to the inductor and effecting relative movement between the inductor and article to cause said surface, for example a working surface, of the article to be traversed and heated by the inductor and immediately quenched by the liquid cooling medium in which it is immersed.

The method of the invention may also comprise the step of directing a jet or jets of liquid cooling medium at critical areas of the article adjacent the surface being heated by the inductor, and maintaining the jet or jets in fixed relationship to the inductor so that the article is relative traversed by the jets. Thereby unwanted creepage of the heat from the portion of the article heated by the inductor into surrounding areas may be substantially prevented.

Additionally, the method of the invention may involve the steps of effecting further relative movement between the inductor and article in a direction, substantially transverse of the aforesaid relative traversing movement to bring a further surface of the article into register with the inductor and then effecting relative traversing movement in the opposite direction to the first relative traversing movement to harden said further surface, the process being then repeated until the desired number of surfaces of the article have been hardened by sequential relative traversing movement of the inductor first in one direction and then in the opposite direction.

The means for carrying the method of the invention into effect comprise carrying means for an inductor, means for feeding electrical current to the inductor, a mounting for the article, means for effecting relative movement between said carrying means and said mounting to enable a surface of the article to be traversed and heated by the inductor, and a container for liquid cooling medium the level of which is maintained with respect to said surface of the article and the heating or work face of the inductor so that these latter are immersed in the cooling liquid during the relative traversing movement of the article by the inductor.

Advantageously means for directing a jet or jets of liquid cooling medium at critical areas of the article adjacent the surface being heated by the inductor may be provided, such means being supported from said carrying means so that they are maintained in fixed relationship to the inductor and the or each orifice from which a jet emerges is immersed below the surface of the liquid cooling medium during said relative traversing movement.

Preferably the relative traversing movement is effected in a horizontal direction, i.e. parallel to and below the surface of the liquid, so that the heating or work face of the inductor and said surface of the article are immersed at a constant depth throughout the heating and quenching step. Such traversing movement may be achieved by moving said carrying means in a horizontal plane whilst the mounting remains stationary. Advantageously means are provided for effecting relative movement in a vertical direction between the container on the one hand and the carrying means and mounting on the other so that the article can be positioned on the latter and adjusted relatively to the inductor while above the surface of the liquid after which the article and heating or work face of the inductor are immersed by raising the container to an operative position relatively to these latter.

Means may also be provided for effecting relative movement between the article and the inductor in a direction substantially transverse of the relative traversing movement therebetween to bring a further surface of the article into register with the inductor, such further surface being then traversed by the inductor by relative movement in the opposite direction. If the article has teeth formed thereon which are to be hardened, such as a gearwheel, said transverse movement may be effected by indexing means which, after a tooth or tooth space has been longitudinally traversed and heated by the inductor, rotate the gearwheel about its axis to bring the next tooth or tooth space of the gear-wheel into register with the inductor to be traversed thereby and hardened.

When the teeth of a gear wheel or toothed segment are to be hardened, guide means may be provided which are fixed relatively to the inductor and coact with the flanks of a tooth or tooth space of the article to accurately position the latter in the angular sense relatively to the inductor during the entire traversing movement. Such guide means may have an entering edge suitably shaped to give a "lead-in" effect as the entering edge engages with the tooth or tooth space of the article. By the term "lead-in effect" we mean that the leading end of the guide means is so shaped, e.g., rounded, beveled, tapered, etc., as to progressively enter the tooth space and cam the gear angularly one way or the other if need be until proper registration and centralization has been obtained. Preferably the guide means coact either with the same tooth or tooth space that is heated by the inductor during the relative traversing movement of the inductor and guide means, or with a tooth or tooth space closely adjacent thereto.

The aforesaid means for directing a jet or jets of liquid cooling medium may comprise two nozzles disposed one on each side of the inductor and in the transverse centre plane of the latter, such nozzles being arranged so that, when the inductor has entered a tooth space, each jet is directed on to the respective top land of a tooth flank bounding such tooth space to prevent the heat from spreading over the top land and "letting down" the top of an adjacent tooth flank that has already been hardened.

A horizontally arranged supporting element is provided for said carrying means on which the latter is slidably and rotatably mounted, the carrying means and inductor being supported during the relative traversing movement both by the supporting element and the guide means which rest on the flanks of a tooth or tooth space so that the carrying means can move angularly about the axis of the supporting element to adapt themselves to any slight variation in the radial depth of the tooth or tooth space. The carrying means may be so balanced about the axis of the supporting element that only a light load is imposed on the guide means. The inductor may be mounted on the carrying means so that it can be rotated about a vertical axis to enable the inductor to be set to the helix angle of a helical gearwheel to be hardened. A similar arrangement may also be employed for the guide means.

Preferably the container for the cooling liquid is raised to its operative position whilst the mounting remains stationary. Means may accordingly be provided for raising and lowering the container, such means being arranged so that the level to which the container is raised can be accurately controlled. The means controlling the supply of electrical current to the inductor and/or the relative movement of the container are preferably interlocked so that traversing movement of the inductor relatively to the article to heat the latter cannot be performed unless the container is raised to its operative level.

If desired the mounting for the article may be arranged so that it can be swung in a vertical plane parallel to the axis of the supporting element to allow the teeth of bevelled gearwheels to be hardened.

An embodiment of the invention in the form of a machine for hardening the teeth of gearwheels by high frequency induction heating will now be described, by way of example, with reference to the accompanying drawings, in which.

Figure 2:
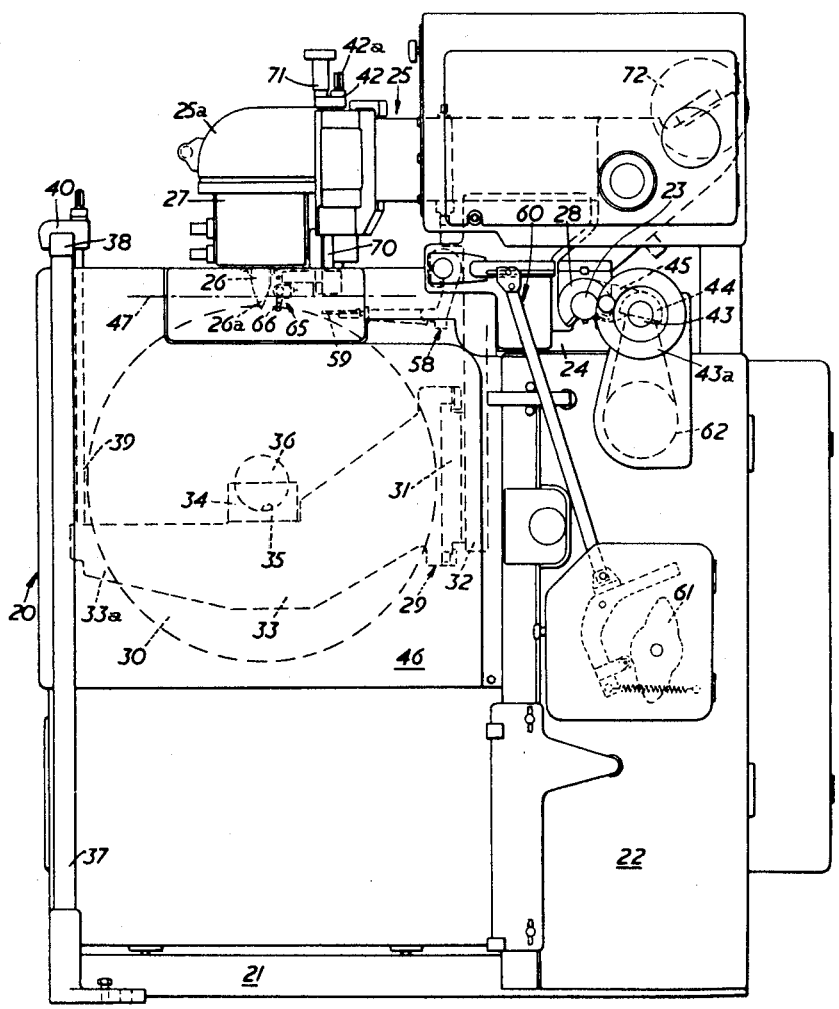
Figure 3:
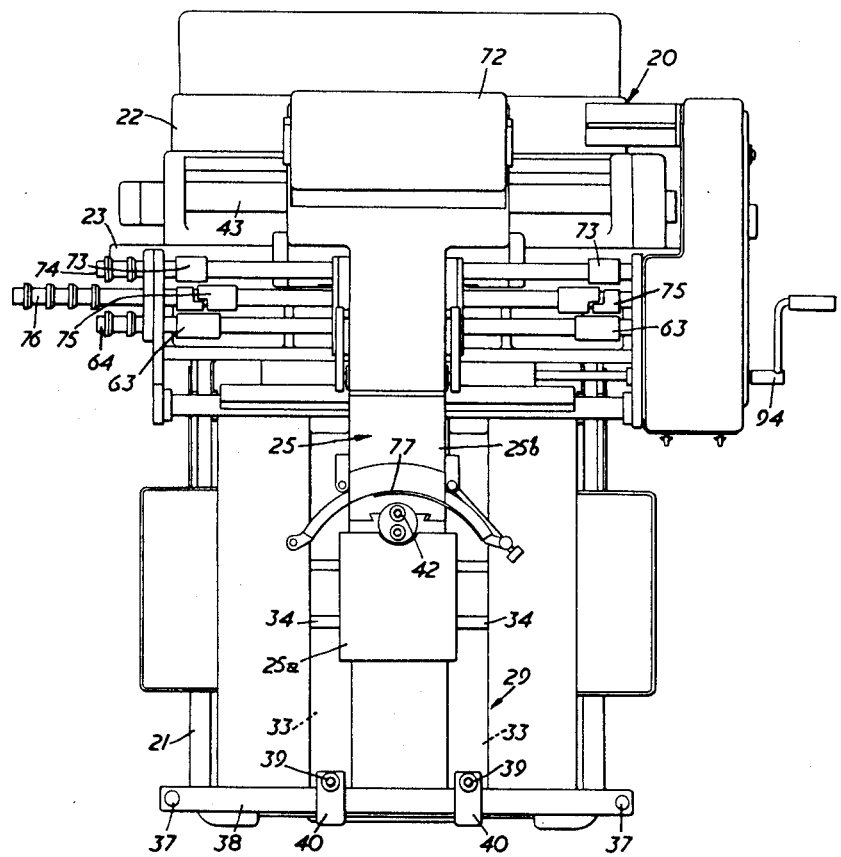
Figure 3 is a plan view.
Figure 5:
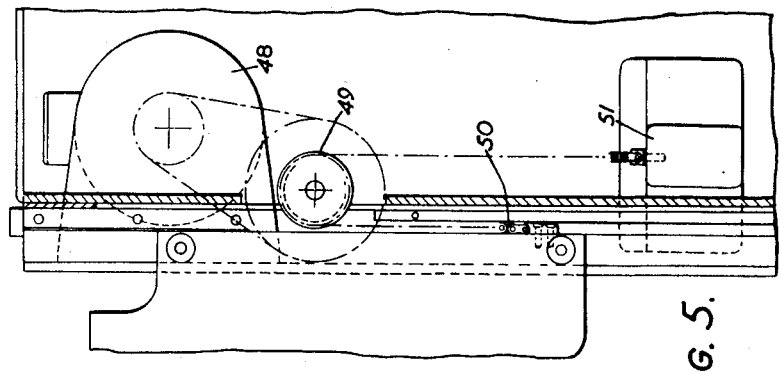
Figure 4:
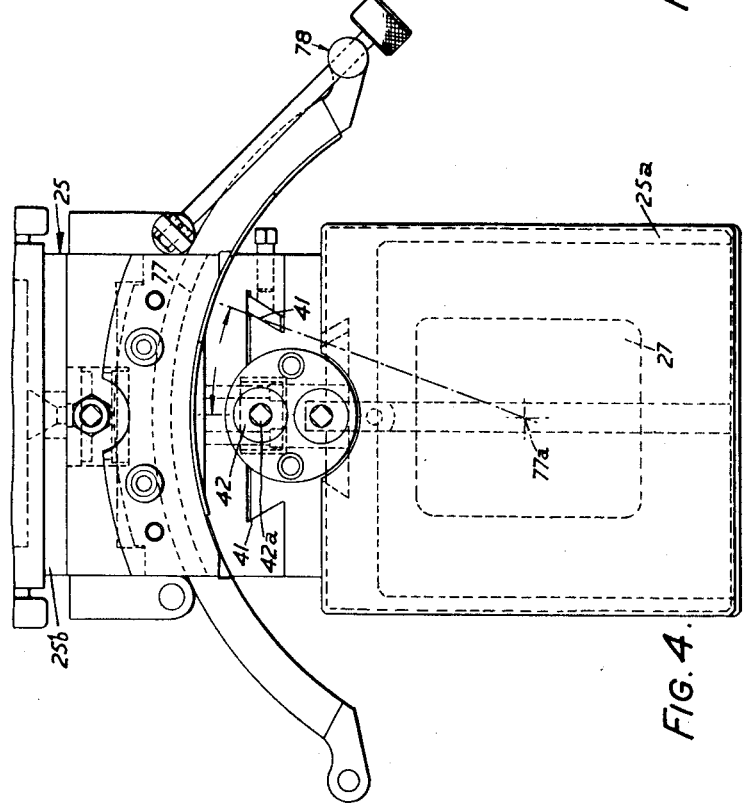
Figure 6:
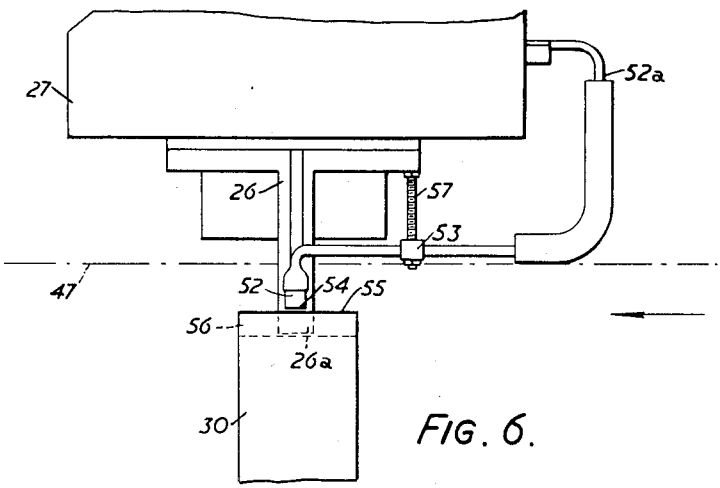
Figure 7:
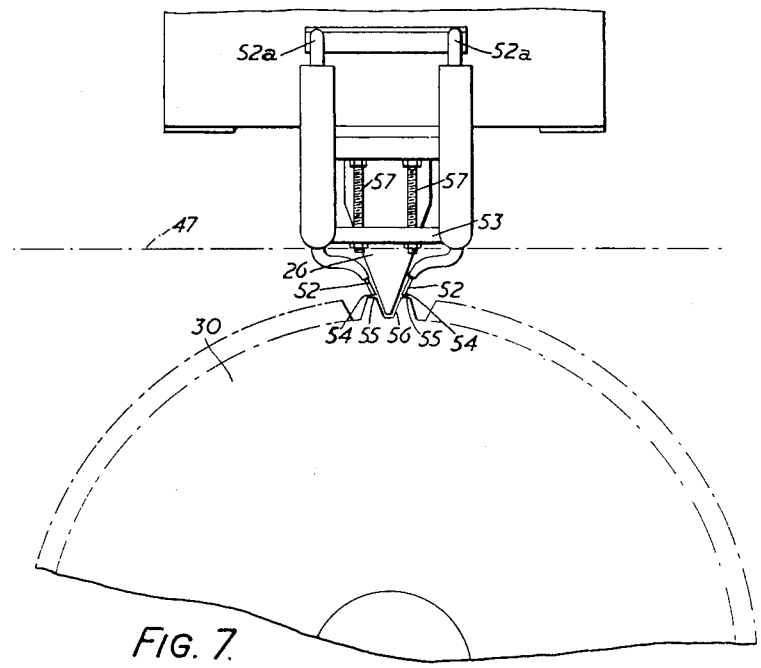
Figure 8:
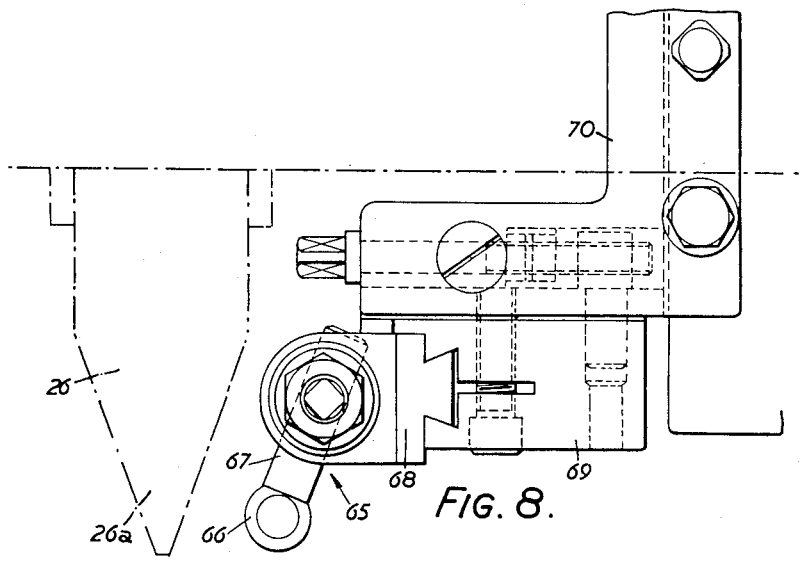
Figure 9:
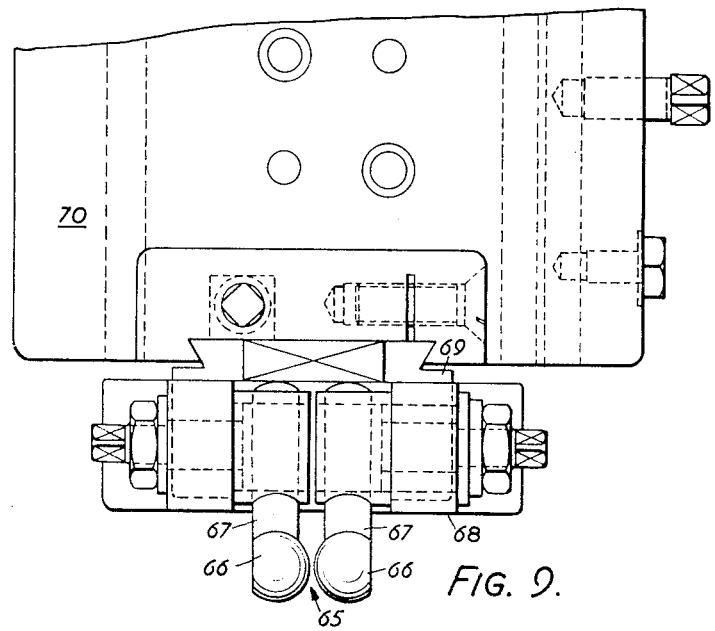
Figure 10:
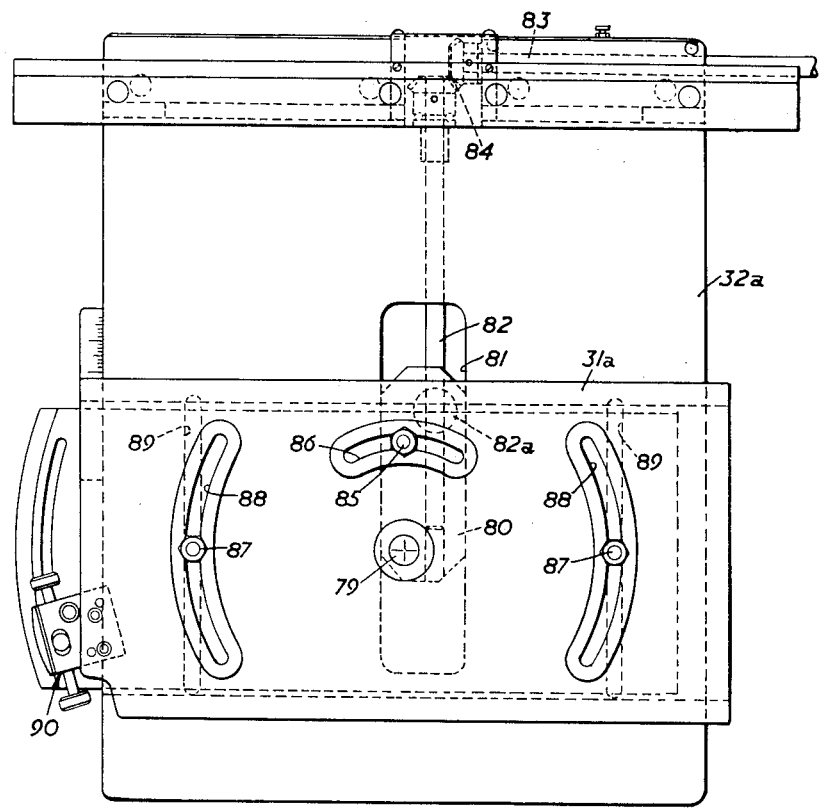

Figure 4 is a broken plan view on a larger scale of an end portion of the carrying means for an inductor shown in Figures 1 to 3, Figure 5 is a detail view of means for raising or lowering a tank containing the cooling liquid, Figure 6 is a detail view of the inductor and of auxiliary cooling means mounted adjacent thereto in the form of nozzles for directing jets of cooling liquid on to the gearwheel, Figure 7 shows the parts illustrated in Figure 6 in the direction of the arrow in that figure, Figures 8 and 9 are side and end views respectively on a larger scale of guide means which locate a tooth space of the gearwheel to be hardened relatively to the inductor during operation of the machine, and Figure 10 illustrates an alternative form of mounting for the gearwheel which can be tipped in the vertical plane to enable the teeth of bevel gearwheels to be hardened.

Figure 1:
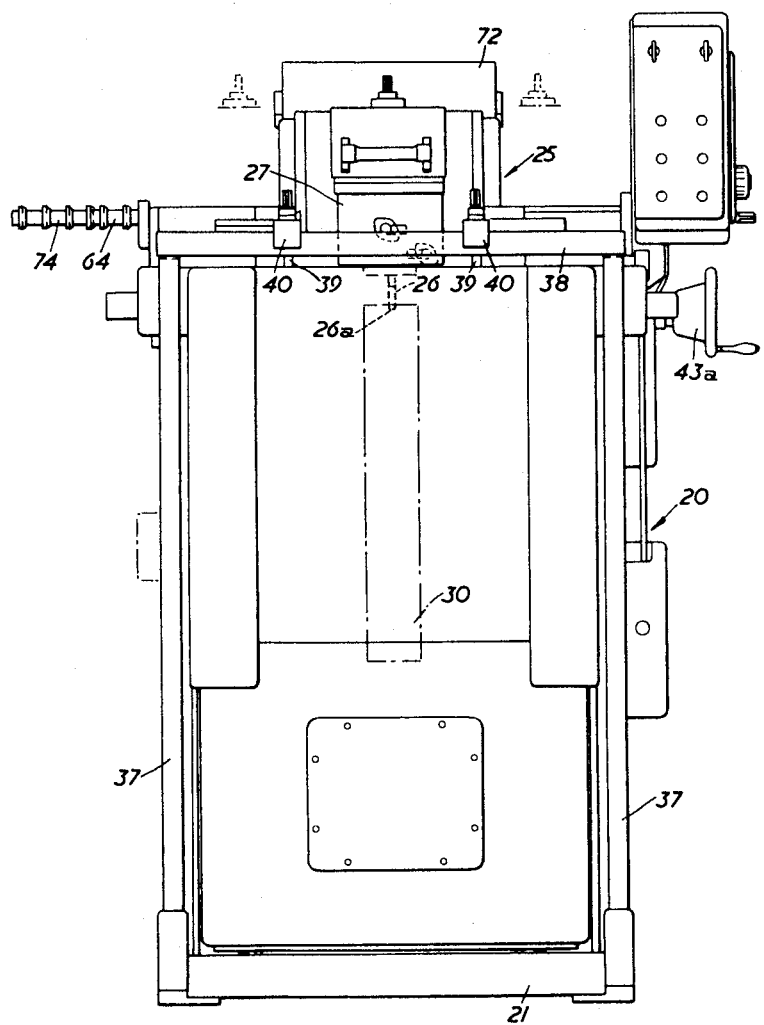
Figures 1 and 2 are front and side elevations respectively of the machine.

Referring to Figures 1 to 3 of the drawings, the body of the machine 20 illustrated therein comprises a base 21 on one side of which a substantially rectangular box-like pedestal 22 is mounted to project upwardly. Across the top of the pedestal 22 a horizontally arranged supporting bar 23, mounted on brackets 24, is provided to support carrying means 25 for an inductor 26 to which high frequency electrical current (which term is intended to include current at normal high frequencies or at radio frequencies) is supplied from a transformer unit 27 depending from the projecting end portion 25a of the carrying means and to the undersurface of which the inductor is detachably secured to project downwardly therefrom. The carrying means 25 are slidably and rotatably mounted on the supporting bar 23 by means of bearings 28 which partly surround the latter. High frequency current is supplied to the transformer unit 27 by a high or radio frequency induction heating generator.

On the same side of the pedestal 22 as that on which the inductor 26 is arranged and below the latter a mounting 29 for the gearwheel 30 to be hardened is provided such mounting being in the form of a surface plate or work table 31 arranged parallel to the front vertical face of the pedestal and carried from a plate-like support 32. The gearwheel 30 is mounted from the surface plate 31 on two horizontally projecting arms 33 the upper surfaces of which carry blocks 34 having semi-circular recesses 35 formed therein to accept a mandrel or shaft 36 on which the gearwheel is mounted, means being provided to retain the shaft in position in the recesses. Preferably the blocks 34 are arranged so that the axis of the shaft 36 lies in the vertical plane containing the vertical centre line of the inductor 26. In the machine illustrated the arms 33 are adapted to support a gearwheel 30 of comparatively large diameter, for example 26", and the arms extend outwardly of the blocks 34 towards support columns 37 upstanding from the opposite sides of the base 21 to that on which the pedestal 22 is arranged. A horizontal rail 38 spans the gap between the upper ends of the columns 37 and the outer ends 33a of the arms 33 are supported from the rail by means of vertical screwed rods 39 which connect such outer ends to brackets 40 slidably mounted on the bar. Means, hereinafter to be described, are provided for raising or lowering the surface plate 31 relatively to the support 32 and the screwed rods 39 are adjusted to suit the position of the surface plate.

Means are provided for raising or lowering the inductor 26 relatively to the mounting 29 for the gearwheel 30 to enable the nose 26a of the inductor, which is of substantially V-shape and arranged so that its apex or nose points downwardly, to be projected into a tooth space of the gearwheel to heat the flanks and trough defining such tooth space. The projecting end portion 25a of the carrying means 25 is attached to the remainder by vertically arranged slides 41, Figure 4, and raising or lowering of the end portion and the inductor 26 carried thereby to enable gearwheels of different diameters to be hardened is manually effected by screw and nut mechanism 42, the upper end 42a of the screw being of square cross-section to receive a detachable handle. The heating step is performed by effecting horizontal traversing movement of the carrying means 25 so that the inductor 26 enters the tooth space of the gearwheel 30 from one end and traverses it axially from end to end. Such traversing movement of the carrying means 25 is effected by a lead screw 43 arranged parallel to the supporting bar 23 which cooperates with a half-nut 44 provided on the carrying means, the half-nut being pivotally attached to the latter by radius arms 45 so that pivotal movement of the carrying means about the supporting bar is not affected by the presence of the half-nut which can also be raised from engagement with the lead screw when required to enable the carrying means to be rapidly slid across the machine.

A container for cooling liquid in the form of a substantially rectangular tank 46 is slidably mounted in the space between the front face of the pedestal 22 and the columns 37, and means are provided for raising or lowering the tank so that the gearwheel 33 and nose 26a of the inductor can be immersed in the cooling liquid by raising the tank until the level of the cooling liquid therein lies between the upper and lower ends of the inductor, as shown at 47 in Figure 2. Raising or lowering of the tank is effected by means of an electric motor 48, Figure 5, which drives a sprocket wheel 49 over which passes a chain 50 one end of which is attached to the tank whilst its opposite end carries a counterweight 51. Stops are provided for controlling the vertical travel of the tank 46 so that the extent of such travel can be set in conformity with the diameter of the gearwheels being processed. Thus, when processing gearwheels of small diameter, the tank travel may be reduced so that the minimum amount of time is required to replace a processed gear by the next one to be treated.

It will be appreciated that in the present method of hardening gearwheels, by causing a narrow band or line of heat to progressively travel along the flanks of two adjacent teeth, there is a considerable variation in the mass of metal behind the heated zone with consequent differing rates of conduction of heat away from such zone, the mass of metal behind the tips or lands of the teeth being, for example, very much less than the mass of metal behind the trough of a tooth space. When hardening is being effected, as in the present machine 10, with the gearwheel 30 completely immersed in the cooling fluid the effect of the mass of metal behind the heated zone is considerably reduced and conduction of heat from the heated zone is more uniform. However, in the case of gearwheels having comparatively narrow tips or lands, or when it is desired to produce a hardness pattern having a well-defined edge on the surface of an article, for example when hardening only the bottom and sides of a slot to leave an unhardened area on both sides of the slot, auxiliary cooling means may be necessary to prevent creepage of heat.

Such auxiliary cooling means in the present embodiment comprise downwardly directed nozzles 52, 52, Figures 6 and 7, arranged one on each side of the inductor 26, and to which cooling fluid is fed through pipes 52a, 52a, the nozzles lying substantially in the transverse centre plane of the inductor. Each nozzle 52 is supported from the upper end of the inductor 26 by a bar 53 so that the nozzles move with the inductor during the traversing movement. The orifice 54 at the lower end of each nozzle 52 is arranged so that it is below the level 46 of the cooling liquid when the tank 46 is in its raised operative position and the nozzles are disposed with respect to the inductor 26 so that each respective jet is directed, as shown in Figure 7, on to a top land 55 of a tooth flank bounding the tooth space 56 being traversed by the inductor. If the inductor 26 is provided with a flux-concentrating core the nozzles are arranged in the transverse centre plane of the core.

Since the temperature attained by the heated zone is of the order of 800° C. or even higher, when water is used as the cooling fluid a film of steam is produced around the heated zone which tends to insulate the portion of the gearwheel 30 surrounding such zone from the cooling action of the surrounding water. Such tendency is overcome by the employment of the above-mentioned quenching nozzles 52, 52 which direct jets of cooling water at the critical areas of the gearwheel.

When the inductor 26 is entering the tooth space 56, the quenching nozzles 52, 52 direct a stream of cooling water along the flank ends of the teeth, which tends to remove any film of steam which may form thereon, or indeed prevent its formation, and allows the flank ends to be more effectively cooled. As soon as the inductor 26 enters the tooth space 56 each quenching jet is directed on to the tips or top lands 55 of the teeth bounding the tooth space and down the adjacent flanks of such teeth, thus removing or avoiding the formation of a film of steam and preventing the heat from spreading over the top land and "letting down" the top of an adjacent tooth flank that has already been hardened. Owing to the progressive traversing movement of the inductor 26 relatively to the gearwheel 30, the narrow band or line of heat induced is always disposed a short distance behind the transverse centre plane of the inductor. The water jets from the quenching nozzles 52, 52 also strike the top lands 55, 55 of the teeth some distance behind the quenching nozzles owing to the resistance offered to the forwardly moving jets by the mass of water in the tank 46. Such trailing of the heated band or line and of the water jets requires matching to a certain extent so that the water jets are aligned in the transverse sense with respect to the heated band and such matching is effected by raising or lowering the quenching nozzles 52, 52 relatively to the inductor 26, in order to vary the resistance offered by the interposed body of water in the tank, thus allowing matching to be effected in both directions of traversing movement of the inductor. Such raising or lowering of the nozzles 52, 52 is effected by raising or lowering the bar 53 by which they are carried, screw adjustment means 57 being provided for this purpose. Elongation of the quenching nozzles 52, 52 in the direction of their movement, as shown in Figure 6, may also be advantageous in certain circumstances to obtain more effective cooling on the end faces and top lands 55, 55 of the teeth.

Means, indicated generally at 58 in Figure 2, are provided for indexing the gearwheel 30 to enable each tooth space to be brought sequentially into register with the inductor 26 and to be traversed thereby. Such indexing means comprise an indexing element 59 disposed adjacent the nose 26a of the inductor and connected by link mechanism 60 to a power-driven cam 61 on the pedestal 22, rotation of the cam effecting timed reciprocating movement of the indexing element to advance the gearwheel one tooth space at a time in a step-by-step manner. The lead screw 43 is also driven by power-operated means indicated diagrammatically at 62 and by means of stops or abutments 63, Figures 1 and 3, carried by a horizontal shaft 64 fixedly connected to the carrying means 25 for sliding movement therewith and cooperating with switchgear, the indexing means 58 may be arranged to operate in timed sequence with the traversing movement of the inductor 26 so that the latter traverses a tooth space to heat the flanks of the teeth bounding such space whereupon the gearwheel 30 is indexed to bring the next tooth space into register with the inductor which then effects traversing movement in the opposite direction to heat the tooth flanks of the next tooth space, the process being automatically repeated until all the tooth spaces have been dealt with. Alternatively the stops 63 and associated switchgear may be arranged so that traversing movement of the inductor 26 through a tooth space is effected after which the supply of high frequency current to the inductor is discontinued and the inductor is returned to its original position before the gearwheel 30 is indexed to bring the next tooth space into register with the inductor to enable the flanks of such next tooth space to be heated.

In the case of plain gearwheels in which there is no shoulder adjacent to the teeth, heating can be carried out in both directions of traverse of the inductor as already described. With shouldered gearwheels, however, the machine is adjusted so that heating is carried out by movement of the inductor in one direction only. In addition to the power-operated means 62 for driving the lead screw 43, a hand wheel 43a is also provided for this purpose.

Accurate positioning of the tooth space to be traversed relatively to the inductor 26 is effected by guide means 65, fixed relatively to the inductor 26 during operation of the machine, which enter a tooth space of the gearwheel 30 and locate the latter angularly during traversing movement of the inductor. Such guide means comprise two balls 66, 66 each mounted at the lower end of a pivoted arm 67, Figures 8 and 9, the length and angular setting of which relatively to a horizontally arranged and transversely movable slide 68 can be varied to enable the position of the balls relatively to the nose 26a of the inductor to be adjusted. Further adjustment of the guide means 65 is also provided by mounting the slide 68 on a further horizontal slide 69 arranged normal to the latter, both such slides being mounted at the lower end of a vertical slide 70 capable of vertical movement in the end portion 25a of the carrying means and operated by a detachable handle 71 positioned above the latter. The rounded surfaces of the balls 66, 66 provide a "lead-in" effect as the guide means 65 engage with the tooth space. Adjustment of the arms 67, 67 and the various slides is effected so that the guide means 65 engage with a tooth space as closely adjacent to the inductor 26 as practicable, preferably with the next tooth space, to avoid accumulation of errors due to slight differences in the tooth spacing. Whilst the inductor 26 is being traversed through the tooth space the carrying means 25 are supported on the supporting bar 23 and the guide means 65 so that the carrying means can rock slightly about the axis of the supporting bar to adapt themselves to any slight variation in the radial depth of the tooth space. A counterweight 72 is provided to reduce the downward pressure exerted by the carrying means 25 on the guide means 65, the counterweight being movable towards and away from the supporting bar 23 to enable the downward pressure to be adjusted so that only a light load is imposed on the guide means.

Means are provided which are sequentially brought into operation by the traversing movement of the carrying means 25 for automatically varying the order of the high frequency current fed to the inductor 26 and/or the speed at which such traversing movement is effected to enable the desired heat pattern to be obtained on the teeth of the gearwheel 30. Sliding movement of the carrying means 25 causes stops or abutments 73 adjustably arranged on a horizontal bar 74 secured at its inner end to the carrying means to be brought into contact with members which are moved by such contact to operate means controlling the voltage of the high frequency current supplied to the inductor and/or to effect speed changes in the mechanism by which the carrying means are moved. In a similar manner stops or abutments 75 on a further horizontal bar 76 effect switching on and off of the high frequency current fed to the inductor 26.

To enable the inductor 26 and guide means 65 to be swung about a vertical axis to conform to the helix angle of a helical gearwheel, the projecting end portion 25a of the carrying means 25 on which the transformer 27 is mounted is formed as a separate unit supported from the inner portion 25b of the carrying means on curved guides 77, Figure 4, in a horizontal plane. The curved guides 77 are arranged relatively to the inductor 26 in such manner that the centre 77a about which they are formed substantially coincides with the vertical centre line of the inductor. Fine adjustment means in the form of screw and nut mechanism 78 are provided to enable the inductor 26 and guide means 65 to be set at the chosen angle and maintained in the desired position.

An alternative form of mounting for the gearwheel is shown in Figure 10, the surface plate or work table 31a being mounted on the support 32a by means of a centrally arranged horizontal pivot 79 so that the surface plate can be tipped in a vertical plane parallel to the axis of the supporting bar 23 about the pivot to enable the trough of a tooth space of a bevel gearwheel to be brought into a horizontal plane so that the tooth space may be traversed by the inductor 26. The pivot 79 is mounted in a block 80 slidably mounted in a vertical slot 81 formed in the support 32a, vertical sliding movement of the block and pivot, and consequently of the surface plate 31a, being effected by a screw shaft 82 engaged by a nut 82a in the block. Rotation of the screw shaft 82 is effected by means of a horizontal shaft 83 through bevel gears 84 to raise or lower the surface plate 31 and gearwheel, which is mounted from the latter on horizontally projecting blocks, not illustrated, towards or away from the inductor 26 to enable gearwheels of different diameters to be dealt with. At its outer end the horizontal shaft is provided with an operating handle 84, Figure 3. To secure the surface plate 31a to the support 32a in the chosen angular position a nut and bolt 85 carried by the block 80 is provided which passes through a curved slot 86 in the surface plate, further securing nuts and bolts 87 mounted in curved slots 88 formed in the surface plate and vertical slots 89 in the support being also provided. Screw and nut adjustment means 90 are arranged at one side of the support 32a and the surface plate 31a to enable angular adjustment of the latter to be accurately effected.

Although the machine described is intended for heat treating gearwheels which are entirely immersed in the cooling liquid, it will be appreciated that in certain applications, for example when the gearwheel is formed from air quenching steel, such total immersion of the gearwheel may be unnecessary and the quenching jets already described, or a different arrangement of quenching jets, may be sufficient to quench the tooth flanks being heated by the latter. When such a quenching arrangement is employed it may be found that the cooling liquid from the jets is sufficient to cool the entire body of the gearwheel; alternatively only a lower portion of the latter may be immersed in the cooling liquid for general cooling purposes.

Furthermore, when dealing with gearwheels of large diameter, the tank 46 for the cooling liquid may be dispensed with and an arrangement for containing the cooling liquid built around the gearwheel, the level of the liquid being arranged so that the inductor, the tooth space being treated, and the auxiliary quenching jets if such are employed, are disposed below the surface of the cooling liquid. If desired, in such an arrangement the upper portion of the gearwheel may project above the level of the cooling liquid.

When heating is carried out by traversing movement of the inductor in one direction only, means may be provided whereby the return traversing movement of the inductor between the heating cycles is accomplished at a considerably higher rate of speed than that employed whilst heating is being effected, the stops or abutments 73 operating switchgear by which the above effect is obtained.

We claim:

1. A means for hardening a re-entrant surface of an article such as the adjacent surfaces of two adjacent teeth of a gear by high frequency induction heating comprising an inductor having a working face adapted to be positioned in closely spaced non-contacting relation with the surfaces of adjacent flanks of two adjacent teeth to be treated so as to cause the surfaces of said flanks to become heated by energy induced therein across the gap maintained between the inductor and said flank surfaces, a shiftable carrier for the inductor, a mounting for the gear to be treated by the inductor, means for moving the inductor in the direction of the teeth of the gear to cause the tooth space in registry with the inductor to be tranversed by the inductor and to be treated progressively, means maintaining the spaced relation between the inductor and the tooth-flank surfaces during the traverse movement of the inductor, a vessel containing liquid cooling medium, and means positioning the vessel and its cooling medium in relation to the inductor and the gear such that the working face of the inductor and the tooth of the gear being treated thereby are immersed in the liquid cooling medium during the aforesaid traversing movement of the inductor.

2. The combination of claim 1 including means for directing a jet of auxiliary liquid cooling medium at the tooth of the gear at a zone adjacent the zone being heated by the inductor, the outlet of said jet-directing means being also immersed in the liquid cooling medium contained in the vessel, and means supporting said jet-directing means from said shiftable carrier in fixed relation with the inductor so that the submerged jet of cooling medium and the submerged inductor move together during the traversing movement.

3. The combination of claim 1 including means for effecting relative movement between the inductor and the mounting for the gear on the one hand and the vessel containing the liquid cooling medium on the other in a vertical direction a sufficient distance to provide for the changing of work pieces and for the making of adjustments while the inductor is above the surface of the liquid cooling medium contained in the said vessel.

4. The combination of claim 1 including means operatively associated with the means for moving the inductor in the direction of the teeth of the gear and operative on the gear to index the gear angularly a preselected increment at the completion of the traversing movement in one direction whereby to bring another tooth of the gear in registry with the inductor, and means operable at the completion of the indexing movement to move the inductor in the opposite direction to cause the progressive heating of the surface of the said another tooth.

5. The combination of claim 2 in which the traversing movement of the inductor is horizontal and parallel to the surface of the cooling medium contained in said vessel so that the working face of the inductor and the tooth surface being treated are immersed at a constant depth in the cooling medium throughout the traversing and heating movement.

6. The combination of claim 2 in which the means for directing a jet of auxiliary cooling medium includes two discharge nozzles disposed one on each side of the inductor at the approximate transverse center plane thereof, such nozzles being so arranged that each jet of auxiliary cooling medium is directed on the top land of the tooth adjacent the inductor to prevent the heat from spreading over the top land and "letting down" the top of an adjacent previously hardened tooth.

7. A machine for hardening the teeth of gears by high-frequency induction heating and quenching combining an inductor having a working face adapted to be positioned in closely spaced but non-contacting relation with the surface of a tooth of the gear to be hardened, means for supporting a gear with a tooth thereof in operative relation with the inductor, means supporting the inductor for lateral movement in the direction of the tooth of the gear to be treated, and guide means carried by the inductor supporting means and movable with the inductor adapted to coact with the flanks of two adjacent teeth of the gear for positioning the gear angularly whereby to maintain said closely spaced but non-contacting relation of the inductor with the tooth being treated thereby throughout the tranversing movement of the inductor along the tooth.

8. The combination of claim 7 in which the guide means carried by the inductor carrying means is provided with a generally tapered leading end adapted to enter the tooth space and engage and center the coacting tooth flanks as the guide means moves laterally, said leading end of the guide means being positioned ahead of the inductor in the direction of travel so that the tooth to be treated thereby is in registry and centralized with the inductor before the heating action commences.

9. The combination of claim 7 in which the means for supporting the inductor includes an oscillatable and shiftable carrier member and a relatively stationary bar member on which the carrier is shiftable and about the axis of which the carrier may oscillate, said bar member being offset from the said guide means that coact with the flanks of two adjacent teeth so that the inductor carrier is supported at two spaced-apart regions during the lateral traversing movement and may oscillate slightly about the axis of the bar member in response to any variation in the contour of the tooth flanks that are engaged by the said guide means.

10. The combination of claim 7 in which the inductor and the guide means are mounted for movement about a vertical axis to the said means for supporting the inductor for lateral movement so that the inductor and the guide means may be angularly adjusted to suit the helix angle of the teeth of the gear to be hardened.

11. The combination of claim 9 including means operative on the inductor carrier member to counterbalance substantially all the weight thereof so that only a relatively small portion of the weight is borne by the said guide means.

References Cited in the file of this patent

UNITED STATES PATENTS

| | | |
|---|---|---|
| 1,866,538 | Andrus | July 12, 1932 |
| 2,167,798 | Denneen et al. | Aug. 1, 1939 |
| 2,312,839 | Kullman et al. | Mar. 2, 1943 |
| 2,461,734 | Hartley et al. | Feb. 15, 1949 |
| 2,521,699 | Denneen et al. | Sept. 12, 1950 |

OTHER REFERENCES

"The Iron Age," Sept. 12, 1946, page 76.

"Heat Treating and Forging," Apr. 1941, page 192.